May 20, 1930.                L. HAMMOND                1,758,947
BATTERY ELIMINATOR
Filed Sept. 7, 1926

Inventor
Laurens Hammond
by Parker & Carter
Attorneys.

Patented May 20, 1930

1,758,947

UNITED STATES PATENT OFFICE

LAURENS HAMMOND, OF CHICAGO, ILLINOIS, ASSIGNOR TO ANDREWS-HAMMOND CORPORATION, OF CHICAGO, ILLINOIS, A CORPORATION OF ILLINOIS

BATTERY ELIMINATOR

Application filed September 7, 1926. Serial No. 134,057.

This invention relates to improvements in means for converting pulsating current, such as delivered by alternating current rectifiers, into smooth, uniform direct current. It may be applied for the smoothing out of the current to be used in the operation of any electrically operable devices where a smooth uniform direct current is employed. It may for example be employed in the operation of electrical toys, trains and the like, or in the operation of thermionic tubes in radio sets. When used with such tubes it has the advantage of elminating any audible hum.

A further object is the provision of such a source of direct current which shall have a very small deterioration, if any, with age and use, and which shall be capable of standing unusued for long periods of time, without deterioration, and which shall be immediately available for use, after such periods of idleness, without requiring special treatment of any kind. The present invention provides a means for storing sufficient electrical energy during the peak of a pulsating direct current wave to effectively maintain the flow of current between pulsations by means of one or more specially constructed electrolytic cells.

My entire device is herein shown as including a transformer, a rectifier and a condenser or current smoother, the rectifier and the condenser having their electrodes preferably but not necessarily immersed in a common electrolyte or body of electrolyte. I may employ other electrolytic cells, or storage batteries of small capacity. The cells may be connected, for example, across the output of an alternating current rectifier. The current from these cells is passed through a choke coil, or filter, having a high impedance and a low resistance. The electrolytic cells may be arranged in a series or in a plurality of series, connected as shown for example in Figure 3.

The further objects and advantages of the invention will be apparent from the following detailed description of the embodiments of the invention shown in the accompanying drawings.

It will be understood that the disclosure herein and the description is for the purpose of illustration and that many changes may be made in the size, shape and disposition of parts and otherwise, without departing from the spirit of my invention. It is desired therefore that both description and drawings be taken as in a broad sense illustrative and diagrammatic.

The invention is illustrated more or less diagrammatically in the accompanying drawings, wherein—

Figure 1:
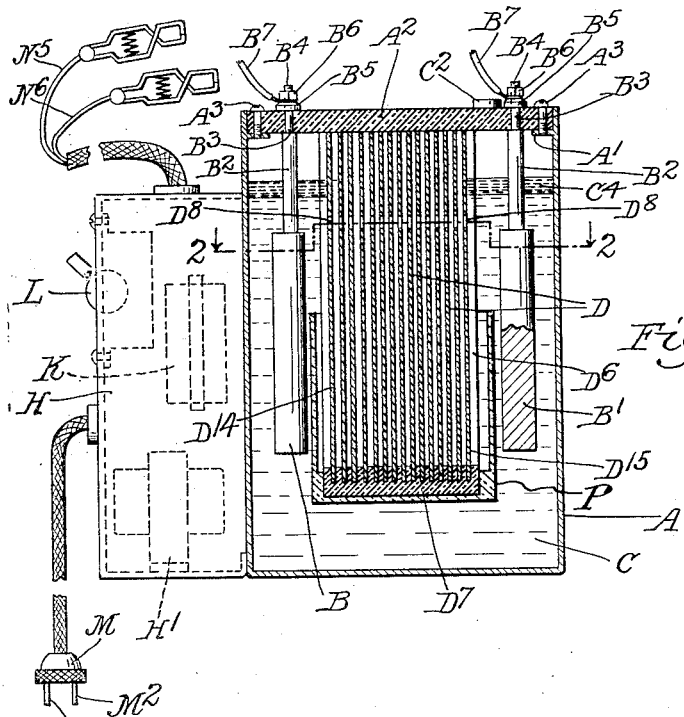
Figure 4:
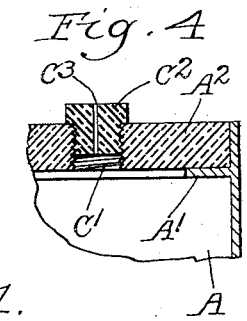
Figure 2:
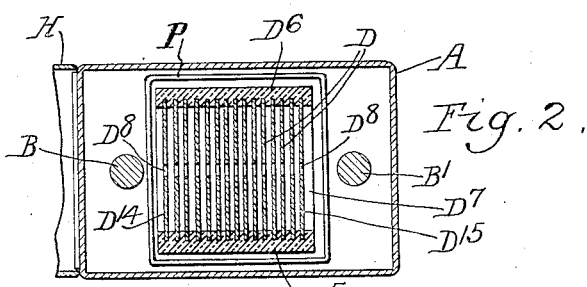
Figure 3:
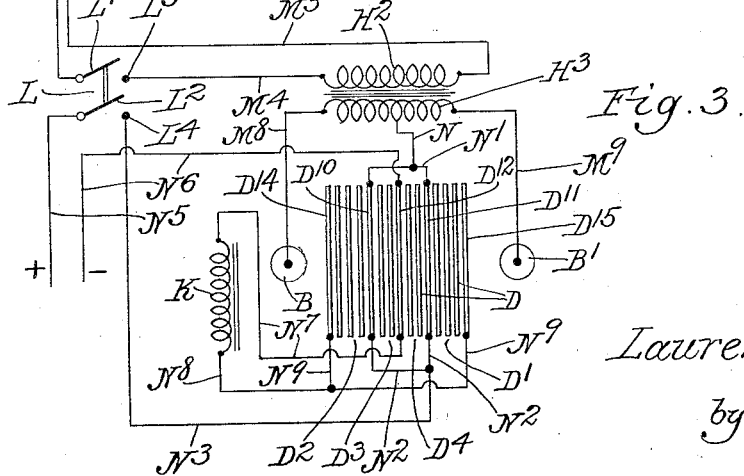

Figure 1 is a vertical longitudinal section;
Figure 2 is a section on the line 2—2 of Figure 1;
Figure 3 is a wiring diagram; and
Figure 4 is a detail section.

Like parts are indicated by like symbols throughout the specification and drawings.

A generally indicates a casing or housing which may, if desired, be of metal, welded or otherwise closed along the seams. Within the top thereof is the supporting flange $A^1$ to receive the top or cover closure $A^2$ of any suitable insulating material which may be secured for example by the screws $A^3$.

Suspended from the cover $A^2$ are a plurality of rectifying electrodes B $B^1$, of any suitable rectifying metal. They are shown as supported by stems $B^2$ reduced as at $B^3$ and terminating above the top of the cover $A^2$ in the binding posts $B^4$. $B^5$ is any suitable nut for drawing up the stem $B^2$ against the cover $A^2$, and for supporting the electrode, and $B^6$ is any suitable nut or member adapted to engage and hold any suitable terminal $B^7$.

C indicates any suitable electrolyte within the housing or container A. It may be admitted for example through the aperture $C^1$, normally closed by the closure $C^2$ vented as at $C^3$. $C^4$ indicates a layer of oil floating upon the surface of the electrolyte and adapted to prevent its evaporation. The electrolyte C serves as the electrolyte of the rectifier for which B $B^1$ are the rectifying electrodes. In the form of my device herein shown in detail I position an electro-chemical condenser within the same body of electrolyte. If desired the terminal plates or electrodes of such condenser may serve also as non-filming metallic electrodes for the rectifier.

The condenser in question is herein shown as a plurality of metal plates, generally indicated as D, depending from the cover $A^2$. They are positioned between the lateral spacing members $D^5$ $D^6$, which are slotted to receive them, and their lower ends may be received in any suitable insulating spacing member $D^7$. The plates so mounted serve at the same time as partitions between adjacent cells and as electrodes for the adjacent cells. The members $D^5$ $D^6$, preferably integral with the bottom member $D^7$, are shown as extending above the normal level of the electrolyte, being in the drawings illustrated as abutting against the lower side of the cover $A^2$. The cells between the plates D are thus separated from the main body of the electrolyte.

In the particular form of condenser herein shown the condenser cells, formed by the plates, are divided into four groups, indicated as $D^1$, $D^2$, $D^3$ and $D^4$. The groups $D^1$ $D^2$, as will later appear, are connected together to form in effect a single group, as are the intervening groups $D^3$ and $D^4$.

The end plates, being exposed to the electrolyte C may serve also as electrodes for the rectifier, and the plates may be vented as at $D^8$, to permit the passage of the electrolyte in the inter-plate spaces. Obviously such a disposition may be employed only in connection with the employment of such metals as will operate in a like electrolyte. When I employ an acid electrolyte I may employ tantalum for the rectifying electrode and lead for the plates. I wish it to be understood that in the claims of this application where I refer to the use of a condenser I wish the word to include any form of electrolytic cell which can function to any extent as a condenser, even though such cell may primarily be of the nature of a secondary battery.

Secured in any suitable manner to the casing A is the subsidiary housing or casing H in which is positioned any suitable transformer, generally indicated as $H^1$ and having, as shown in the wiring diagram, the primary coil $H^2$ and the secondary coil $H^3$.

Also positioned in the housing H is any suitable choke coil, generally indicated as K. L indicates a two contact switch having the leaves $L^1$ $L^2$ in opposition to the contacts $L^3$ $L^4$.

Referring particularly to the wiring diagram of Figure 3, M indicates a member adapted to be plugged into any suitable electric light socket, having the leaves $M^1$ $M^2$, whereby it may receive an alernating current. The primary coil $H^2$ of the transformer is thereby put in circuit with the alternating current, through the conductors $M^3$ and $M^4$, the conductor $M^4$ being broken by the switch L, the circuit being closed when the leaf $L^1$ engages the contact $L^3$.

The secondary coil $H^3$ of the transformer is in circuit, through the conductors $M^8$ $M^9$ with the rectifying electrodes B, $B^1$.

The conductor N extends from said secondary transformer coil $H^3$ and, with its branch $N^1$, connects with the plates $D^{10}$ $D^{11}$, the first of which is intermediate the cell groups $D^2$ $D^3$ and the second intermediate the cell groups $D^1$ $D^4$. It will be understood that each such plate forms a uni-polar electrode and division plate between the said groups or series of cells. The remaining plates are bi-polar, in the sense that one side of each such plate, serves as the positive electrode for the cell the electrolyte of which engages it, and the other side serves as the negative electrode for the cell the electrolyte of which engages it.

The plates $D^{10}$ $D^{11}$ are further connected by the conductor $N^2$ in communication with the conductor $N^3$ which extends to the contact $L^4$ adapted to be engaged by the switch leaf $L^2$. $N^5$ is a conductor extending from said switch $L^2$, to any suitable output terminal.

From $D^{12}$, the uni-polar intermediate plate interposed between the cell groups $D^3$ and $D^4$ extends the output conductor $N^6$. The plate $D^{12}$ is also connected, by the conductor $N^7$, with the choke coil K, from the opposite end of which extends the conductor $N^8$, with its conductive connections $N^9$, to the end plates $D^{14}$ $D^{15}$ of the cell groups $D^2$ and $D^1$ respectively.

It may be desirable to cause the device to cease operating when the liquid drops to a certain predetermined level, in order to prevent the level of the liquid from falling too low in the condenser cells. This may be accomplished in a variety of ways but I illustrate, as a satisfactory procedure, surrounding the condenser end plates, which also constitute the non-rectifying electrode of the rectifier, with a liquid tight container P, of a non-conducting material, such as hard rubber, which extends from the bottom of the cells up to the particular point or level below which it is desired that the liquid level should not fall. When the liquid level drops to the top of this container, the connection between the rectifier and the condenser will be broken and the device will cease operating until additional water is added to bring the level of the electrolyte above the top of said non-conducting container.

I prefer to have a maximum length of line around which contact is simultaneously broken, in order that the increased resistance due to the restriction of the electrolyte through which the current passes shall be as slight as possible. In the form herein shown increased resistance is slight and occurs only at the very termination of the connection between the bodies of electrolyte separated by their fall in level.

The use and operation of my invention are as follows:

Alternating current, from whatever source used, passes through the primary coil $H^2$ of a transformer, and induces in said secondary coil an alternating current generally of substantially lower voltage. I rectify such alternating curent by passing it through the rectifying electrode or electrodes B $B^1$ in the electrolyte C. The rectifying electrodes may be of any metal or substance having suitable rectifying characteristics. I may employ as an electrolyte any liquid suitable for use with the particular metal selected as an electrode.

The rectified current, necessarily a surging or pulsating direct current, passes from the electrodes, through the electrolyte, to the electro-chemical condenser. If the rectifying electrodes and the metal plates of said condenser are immersed in the same body of electrolyte, or in communicating bodies, the plates, for example the terminal plates $D^{14}$ $D^{15}$, may serve at the same time as the nonfilming metallic electrodes for rectification, and as electrodes for the cells employed in smoothing or evening the pulsating current after its rectification and before its delivery for final use.

The various cells formed by the closely positioned parallel metallic plates are in series, the current passing for example from each electrode across the intervening electrolyte to and through the next electrode and thus from cell to cell.

The smoothing or filtering operation of the condenser is as follows:

It will be understood that the rectified, unidirectional pulsating current flows into such cells during that part of the cycle at which the voltage is high, and an amount of energy is stored. During that portion of the cycle at which the voltage of the circuit falls below the potential of the condenser, namely the sum of voltages of the individual cells employed, the condenser delivers a current which flows back into the circuit, thereby tending to maintain the voltage of the circuit.

If a choke coil is placed in the circuit between the electro-chemical condenser and the load, it will tend to oppose any change in the current flowing through it, and will add its effect to the effect of the electro-chemical condenser, tending to maintain a uniform voltage across the load.

Referring to the wiring diagram of Figure 3 the alternating current passing through the secondary coil $H^3$ passes alternately through the rectifying electrodes B and $B^1$. The condenser cell groups $D^1$ $D^2$ are in effect a single group and perform a function as a group, regardless of which rectifying electrode is at the particular instant rectifying the alternating current. $D^3$ $D^4$ form a second group of condenser cells, the two groups being placed in parallel across the circuit. Between the two groups is the choke coil K, in series with the circuit. I prefer to employ the invention of Edward F. Andrews, disclosed or shortly to be disclosed in a co-pending application, which consists in the employment of a smaller number of condenser cells in the series on the output side of the choke coil, in order to compensate for the resistance of the choke coil and to maintain a generally uniform average voltage across the individual condenser cells.

An example of a suitable electrolyte is an aqueous solution of potassium hydroxide, in a twenty-five percent solution with all of the chlorides eliminated so that corrosion of the electrodes does not occur. Any alkaline electrolytes having low resistance which do not attack the metal electrodes may be used.

An example of the electrodes may be a metallic electrode of the iron group, namely nickel or cobalt, the other two metals which, with iron constitute the iron group.

I claim:

1. In an electrical device adapted to receive an alternating current and to deliver a direct current of generally constant flow, a rectifier and a condenser having electrodes immersed in a fluid electrolyte, and a container, adapted to contain said electrolyte and to enclose said rectifier and condenser, the electrodes of the condenser comprising a plurality of metallic plates positioned in said electrolyte, and insulating means for separating and spacing them.

2. In an electrical device adapted to receive an alternating current and to deliver a direct current of generally constant flow, an electrolytic rectifier and a condenser adapted to utilize the same electrolyte, said rectifier and condenser being enclosed in a common fluid container which contains said electrolyte, the condenser including a plurality of metallic plates and insulating means for separating and spacing them, means for permitting a leakage of the electrolyte from the interior of the common fluid container into the spaces therebetween.

3. In an electrical device adapted to receive an alternating current and to deliver a direct current of generally constant flow, an electrolytic rectifier and a condenser adapted to utilize the same electrolyte, said rectifier and condenser being enclosed in a common fluid container which contains said electrolyte, the condenser including a plurality of metallic plates and insulating means for separating and spacing them, said plates being apertured to permit the flow of the electrolyte therethrough.

4. In an electrical device adapted to receive an alternating current and to deliver a direct current of generally constant flow, an electrolytic rectifier and a condenser adapted to utilize the same electrolyte, said rectifier and condenser being enclosed in a common fluid container which contains said electrolyte, the condenser including a plurality of metallic plates and insulating means for separating and spacing them, said plates being apertured to permit the flow of the electrolyte therethrough, at a level below the normal level of the electrolyte within the container.

5. In an electrical device adapted to receive an alternating current and to deliver a direct current of generally constant flow, an electrolytic rectifier and a condenser adapted to utilize the same electrolyte, the condenser having as electrodes a plurality of metallic plates and insulating means for separating and spacing them.

6. In an electrical device adapted to receive an alternating current and to deliver a direct current of generally constant flow, a transformer, and an electrolytic rectifier and a condenser adapted to use the same electrolyte, a common fluid container for said electrolyte, in which rectifier and condenser are housed, said condenser including a plurality of series of cells, an impedance between said series of cells, a supplemental container associated with said common fluid container, the transformer and the impedance being positioned in said supplemental container.

7. In an electrical device adapted to receive an alternating current and to deliver a direct current of generally constant flow, a liquid container and an electrolyte therewithin, a cover for said container, a rectifying electrode depending from said cover and immersed in said electrolyte, and an electro-chemical condenser depending from said cover, comprising a plurality of closely spaced metallic plates, and insulating closure and spacing members about the edges thereof.

8. In an electrical device adapted to receive an alternating current and to deliver a direct current of generally constant flow, a liquid container and an electrolyte therewithin, a rectifying electrode immersed in said electrolyte and an electro-chemical condenser, within said container, comprising a plurality of generally parallel closely spaced metal plates, said plates being arranged in series to form groups of cells, a circuit having input and output terminals, said cell groups or series being connected in parallel across said circuit, and a choke coil, in series with the circuit, therebetween.

9. In an electrical device adapted to receive an alternating current and to deliver a direct current of generally constant flow, a liquid container and an electrolyte therewithin, a plurality of rectifying electrodes immersed in said electrolyte and an electro-chemical condenser within said container and immersed in said electrolyte, said condenser comprising a plurality of spaced metal plates, the terminal plates of the series being exposed to the electrolyte within the container and being adapted to serve as non-filming metallic electrodes for the rectifier.

10. In an electrical device adapted to receive an alternating current and to deliver a direct current of generally constant flow, a rectifier and a condenser and a body of liquid electrolyte common to the two, and means for breaking the circuit between the rectifier and the condenser when the liquid falls to a predetermined level.

11. In an electrical device adapted to receive an alternating current and to deliver a direct current of generally constant flow, a rectifier and a condenser and a body of fluid electrolyte normally common to the two, and means for separating said electrolyte into separate bodies, when the liquid falls to a predetermined level.

12. In an electrical device adapted to receive an alternating current and to deliver a direct current of generally constant flow, a liquid container and an electrolyte therewithin, a rectifying electrode immersed in said electrolyte and an electro-chemical condenser within said container and normally immersed in said electrolyte, and means for breaking the circuit between the rectifier and the condenser when the liquid electrolyte falls to a predetermined level, comprising a liquid impervious open topped container surrounding the lower portion of said condenser.

13. In an electrical device adapted to receive an alternating current and to deliver a direct current of generally constant flow, a rectifier and a condenser, a container in which both rectifier and condenser are positioned, the condenser including a pack of plates insulated and spaced from each other, a body of electrolyte in the container, the end plates only of the pack being exposed to the main body of the electrolyte.

14. In an electrical device adapted to receive an alternating current and to deliver a direct current of generally constant flow, a rectifier and a condenser, a container in which both rectifier and condenser are positioned, the condenser including a pack of plates insulated and spaced from each other, a body of electrolyte in the container, the end plates only of the pack being exposed to the main body of the electrolyte, the rectifier including a pair of rectifying electrodes, each of said electrodes being positioned in the main body of electrolyte in opposition to one of the exposed end plates of the condenser.

Signed at Chicago, county of Cook and State of Illinois, this 10th day of August, 1926.

LAURENS HAMMOND.